C. J. MANNING.
PRESSURE GAGE.
APPLICATION FILED MAY 17, 1910.
1,043,618. Patented Nov. 5, 1912.
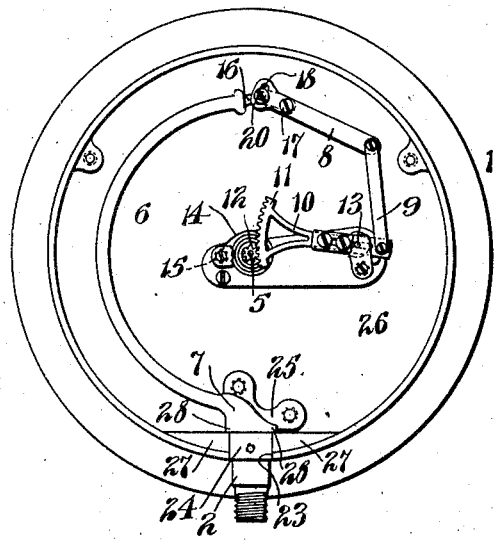
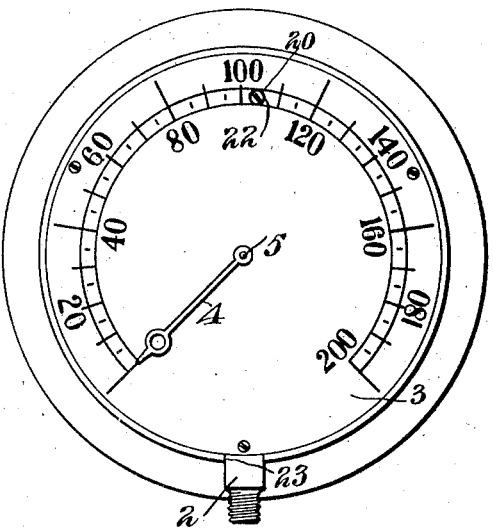
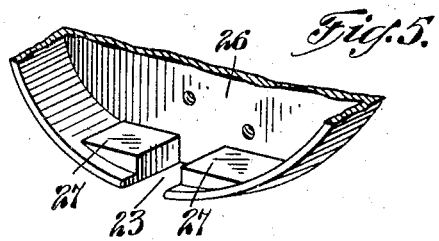
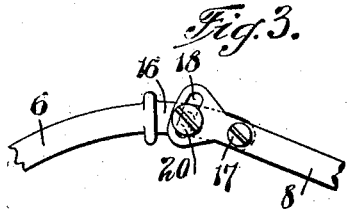
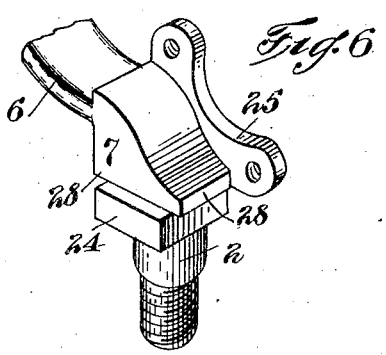
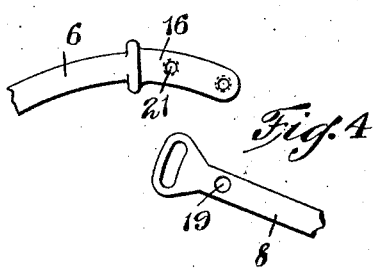
Witnesses:
Inventor:
Coleman J. Manning;
By Wright Brown Quimby May
Attys

UNITED STATES PATENT OFFICE.

COLEMAN J. MANNING, OF MEDFORD, MASSACHUSETTS, ASSIGNOR TO AMERICAN STEAM GAUGE AND VALVE MANUFACTURING COMPANY, OF BOSTON, MASSACHUSETTS, A CORPORATION OF NEW JERSEY.

PRESSURE-GAGE.

1,043,618.  Specification of Letters Patent.  Patented Nov. 5, 1912.

Application filed May 17, 1910. Serial No. 561,905.

*To all whom it may concern:*

Be it known that I, COLEMAN J. MANNING, of Medford, in the county of Middlesex and State of Massachusetts, have invented certain new and useful Improvements in Pressure-Gages, of which the following is a specification.

This invention relates to gages for indicating fluid pressures of the type in which a Bourdon tube spring is used, and has for its object to provide an improved means by which the position of the pointer or other indicating element may be adjusted more easily and accurately than heretofore, and particularly without requiring removal of the dial from the case of the gage.

Another object is to improve the construction of the gage to permit more ready and easy mounting of the tube spring and the head or socket of the gage in the case.

The manner in which my invention is carried into effect is described in detail in the following specification, and illustrated in the accompanying drawings, in which, Figure 1 represents a gage having my invention applied thereto shown in front elevation. Fig. 2 is an elevation of the gage with the dial removed, showing the elements in the form in which at present I prefer to embody my invention. Fig. 3 is a detail elevation of the construction by which the first of the above-named objects is secured. Fig. 4 represents in elevation the two members or elements shown in Fig. 3 separated from one another. Fig. 5 is a perspective view of the lower part of the gage casing illustrating the other principal feature of my invention. Fig. 6 is a perspective view of the head or socket to which the tube spring is connected, and into which the fluid is admitted for actuating the gage.

The same reference characters indicate the same parts in all the figures.

Referring to the drawings, and first to Fig. 1, the casing of the gage is designated by the numeral 1, from which at the bottom projects a nipple 2, with which the pipe conducting the steam or other fluid of which the pressure is to be measured is connected. The usual graduated dial is represented at 3 and the pointer coöperating with the dial for indicating pressures is represented at 4. This holder is secured upon the end of a pin or arbor 5, which passes through an aperture in the center of the dial and is actuated by a Bourdon tube.

Referring to Fig. 2 the tube is represented at 6 and is shown as connected at one end with a head or socket 7 located within the casing, from which the nipple 2 projects. The connections by which movement of the free end of the tube is communicated to the pointer consist of an arm 8, a link 9, a lever 10 carrying a toothed segment 11, and a pinion 12 in mesh with said segment and secured upon the spindle or arbor 5 of the pointer. The lever 10 is pivoted upon a stud 13, and is connected with the arm 8 through the link 9. Thus when the tube is distorted by the fluid forced into it under pressure, the segment 11 is oscillated by means of the linkage described and the pointer thereby moved rotarily through the spindle 5 and pinion 12, which meshes with the segment. The usual hair spring 14 is connected to the spindle 5 and to a fixed stud 15.

It frequently happens that the pointer fails to occupy exactly the zero position when pressure is removed from the tube, owing to incorrect adjustment of the motion-transmitting connections, and for the purpose of correcting the pointer I have devised a means by which the angular relation of the arm 8 with respect to the tube may be adjusted to the amount necessary for the required correction, and thus without necessitating removal of the dial. For the purpose of permitting such adjustment of the arm 8 the spring tube is provided with the projecting finger 16, to which the arm 8 is pivotally connected by means of a screw 17. In the end of the arm is a transverse slot 18 which is curved, its center of curvature being the aperture 19 through which the screw 17 passes. A second screw 20 passes through the slot 18 and is threaded into a tapped hole 21 in the finger 16. By loosening the screw 20 the arm 8 may be adjusted angularly about the pivot screw 17 until the pointer occupies the desired position, whereupon the screw 20 may be tightened to bind the arm in this adjustment. The head of the screw 20 overlaps the sides of the slot 18 and so binds the arm 8 in fixed relation to the tube.

In the dial 3 is an aperture 22 directly over the screw 20 for the purpose of admitting a screw-driver to engage and loosen the screw whenever adjustment of the pointer is required without necessitating removal of the dial. As will be readily understood, when this screw is loosened, the pointer may be moved in either direction to the desired point, and the screw may be again tightened, whereupon the adjustment of the pointer will be preserved. Preferably the head of the screw 20 is comparatively long, so that it lies but a short distance back of the dial and thus is readily accessible.

I am aware that heretofore gages have been designed in which adjustment of the linkage between the spring tube and the pointer is possible, but in all of such gages, so far as I am aware, it is necessary to remove the dial before any such adjustment can be accomplished. Moreover to the best of my knowledge there is no other form of adjustable linkage which can be adjusted so easily and accurately as this one, for with my invention it is only necessary after loosening the clamp screw to shift the pointer into the desired location, and the adjustment is made. In the other adjustable devices, the adjustment is made by relative movement of parts remote from the pointer at such points that the movement of the pointer in response to such adjustment furnishes no guide to the accuracy of the adjustment.

The other principal object of my invention relates to the manner of assembling the Bourdon spring in the case. Heretofore it has been the usual practice to pass the nipple 2 through a circular hole in the side of the case from the interior thereof, and secure the head 7 in the case by screws. Such a mode of assembling is attended with difficulties, in that it involves a more or less serious distortion of the spring tube, before it and the nipple can be put in the case prior to passing the nipple through the aperture in the side of the case. In order to make the insertion of the spring tube more simple, I form a slot 23 in the circular wall of the casing extending in from the edge thereof, into which the head 7 is passed. This head is provided with a non-circular portion 24, preferably rectangular in outline, the opposite sides of which fit the sides of the slot 23. On the head is a lug 25 which bears against the back wall 26 of the casing and is provided with one or more apertures through which screws are passed to secure it in the casing. In this connection it should be noted that the gage case as usually constructed consists of a flat back wall from which projects a circular flange forming the side walls of the case, the front being open until covered by the removable dial 3. Then by forming an open slot 23 in the curved wall of the case, a passage is made into which the gage head may be very easily passed. At each side of the slot the walls of the case are thickened to provide shelves 27, on which shelves 28 of the head 7 rest, which shelves, the non-circular shank of the head and the screws in the lug 25 coöperating with the shelves 27, the walls of the slot 23 and the back wall of the case respectively, securely hold the head 7 and the spring tube in place with the latter in its proper relation to the back of the case. This rotation-preventing connection between the head and the case enables force to be applied to the latter for turning it, without injuring the Bourdon tube. It is sometimes necessary or desirable to turn the gage somewhat after it has been set up, and the easiest and most apparent way to do so is by grasping the gage case and giving it a twist. As the nipple is screwed tightly into the pipe which conducts the pressure fluid to the gage, there is, of course, considerable resistance to turning, and in the old type of gage this resistance is borne entirely by the screws which secure the head to the back of the case. The result is that the screws are more or less distorted and the case sometimes turned relatively to the head and Bourdon tube by a great enough amount to interfere with the perfect operation of the tube. Operations of this character have frequently been the cause of inaccurate working of pressure gages and unmerited blame of the manufacturers thereof. With the construction which I have invented, that of a non-rotative connection between the head and the case, possibility of any such disarrangement is absolutely prevented, no matter how great the force employed in twisting the case, or how great the resistance of the nipple may be to turning. In other words the case of the gage itself may be used as a wrench in applying the gage to a pressure pipe or in adjusting it thereon, and when so used there will be no disarrangement of the working parts

I claim,—

1. In a pressure gage a dial having an aperture, an indicating pointer movable over said dial, a pressure-actuated member, connections between said member and pointer, whereby movement of the former is transmitted to the latter, said connections being adjustable for correcting the position of the pointer, and a clamp for securing the adjustment of such connections accessible through such aperture.

2. In a pressure gage the combination of a Bourdon tube, a pointer, an oscillating lever in geared relation with said pointer, an arm pivotally mounted upon said Bourdon tube, a link connecting said arm and lever, and means for securing said arm to said tube in any angular adjustment with respect thereto within limits.

3. In a pressure gage a Bourdon tube, a dial extending over said tube and having an aperture, a pointer movable over said dial, motion-transmitting connections between said tube and pointer also covered by said dial, and means for permitting adjustment of said connections to shift the position of the pointer without altering its amplitude of swing, accessible through the aperture in said dial.

4. In a pressure gage a curved spring tube, an arm pivoted to said tube and having a transverse slot, a clamp member passing through said slot into engagement with said tube and adapted to be clamped against said arm to retain the latter in any angular position within limits with respect to said tube, a pointer, and motion-transmitting connection between said arm and pointer including a segment geared to the pointer and a link pivoted to said segment and the arm whereby the pointer is oscillated in response to distortions of the tube.

In testimony whereof I have affixed my signature, in presence of two witnesses.

COLEMAN J. MANNING.

Witnesses:
 HARRY L. ALLEN,
 P. W. PEZZETTI.